United States Patent [19]
Chester

[11] Patent Number: 5,346,305
[45] Date of Patent: Sep. 13, 1994

[54] COMPOSTING APPARATUS

[76] Inventor: Francis B. Chester, 305 Monmouth Ave., Spring Lake, N.J. 07762

[21] Appl. No.: 149,044

[22] Filed: Nov. 8, 1993

[51] Int. Cl.⁵ .................. C05F 11/08; C05F 11/06; B01F 9/02
[52] U.S. Cl. ........................................ 366/233; 71/9; 422/184; 366/234
[58] Field of Search ............... 366/220, 221, 225, 233, 366/234, 235, 213, 54, 56; 422/184, 209; 71/9, 8

[56] References Cited

U.S. PATENT DOCUMENTS

| | | | |
|---|---|---|---|
| 3,837,810 | 9/1974 | Richards | 71/9 |
| 3,890,129 | 6/1975 | Chester | |
| 3,942,769 | 3/1976 | Maurice | 366/233 |
| 3,966,415 | 6/1976 | Chester | 422/184 |

Primary Examiner—Robert W. Jenkins
Attorney, Agent, or Firm—Schweitzer Cornman & Gross

[57] ABSTRACT

A rotary drum-type composting apparatus is disclosed, in which the drum is of circular cross section and is supported for rotation about a horizontal axis by means of external support wheels. An access opening is provided in the sidewall of the drum for loading of compostable material, and a removable flexible, waterproof cover is applied over perforated sidewalls of the drum, enabling the interior of the drum to be closed off so that the composting processes can occur. The drum is mounted as close to the ground or supporting surface as practicable, to facilitate manual loading of compostable materials. A clearing bar is installed on the outer surface of the drum, preferably on a removable door panel provided for closing the access opening. The clearing bar operates between the outer surface of the drum and the support wheels and their mounting shafts. During sifting operations, following completion of composting, the clearing bar sweeps away a clearance space below the drum, for efficient outsifting of the composted material from the drum.

3 Claims, 3 Drawing Sheets

5,346,305

COMPOSTING APPARATUS

RELATED CASES

The subject matter of this application is closely related to and constitutes an improvement on my earlier U.S. Pat. Nos. 3,890,129 and 3,966,415. The disclosures of these patents are incorporated herein by reference.

BACKGROUND AND SUMMARY OF THE INVENTION

My beforementioned patents disclose a rotatable drum-type composting apparatus which is uniquely advantageous in the composting of various organic waste material. The basic apparatus comprises a drum, which is mounted for rotation about a horizontal axis, slightly above the ground or other supporting surface. The sidewalls of the drum are formed of mesh or perforated paneling, and one section of the drum wall is removable or openable to provide access for loading of compostable materials into the drum. In a typical case, the drum is loaded with organic waste materials such as leaves, grass clippings, small twigs, household waste or the like. The perforated sidewalls of the drum are covered by a generally waterproof, removable cover during the composting phase.

After being loaded with compostable materials, closed and covered, the drum is rotated about its horizontal axis for a short period of time in order to thoroughly mix the contents. Thereafter, the covered drum is kept generally motionless for a period of time, typically around two weeks, during which the composting process takes place.

Advantageously, the composting process is monitored by means of a thermometer inserted well into the body of compostable material. In a typical case, the composting process will cause the temperature of the material to increase to a level of around 150°-160° within two or three days. After another day or so, the temperature will tend to level off at around 130° F. for several days. By the end of the second week, the temperature will have dropped back to ambient levels, signalling that the composting process has been completed.

In accordance with known procedures, after the composting process has been completed, the external cover is removed from the drum, and the drum is rotated continuously for a period of time, to cause the composted material to be sifted out through the perforated sidewalls of the composting drum.

The present invention is directed to specific improvements in the known composting apparatus focused specifically on facilitating the sifting out of the composted material as well as facilitating the access to and removal of the sifted-out material. The apparatus of the invention employs a composting drum of circular cross section supported at the opposite ends of its cylindrical walls by pairs of rollers, at least one of which is power driven. The drum is thus supported a short distance above the ground or other supporting surface, at a level such that the access door to the interior of the drum is at a height suitable for manual loading of materials into the drum. Inasmuch as loading height limitations impose a practical limit on the height above the support surface that the drum can be mounted, sifting of materials from a cylindrical drum can become inhibited by filling up of the space between the support surface and the bottom of the drum. Pursuant to the invention, a clearing bar is provided on the outer surface of the cylindrical drum, dimensioned and positioned to pass between the drum and the mounting shafts of the support rollers. On each revolution of the drum, the clearing bar sweeps clean a clearance area underneath the drum, to allow normal sifting and discharge to take place.

For a more complete understanding of the above and other features and advantages of the invention, reference should be made to the following detailed description of a preferred embodiment of the invention and to the accompanying drawings.

DESCRIPTION OF A PREFERRED EMBODIMENT

Figure 1:
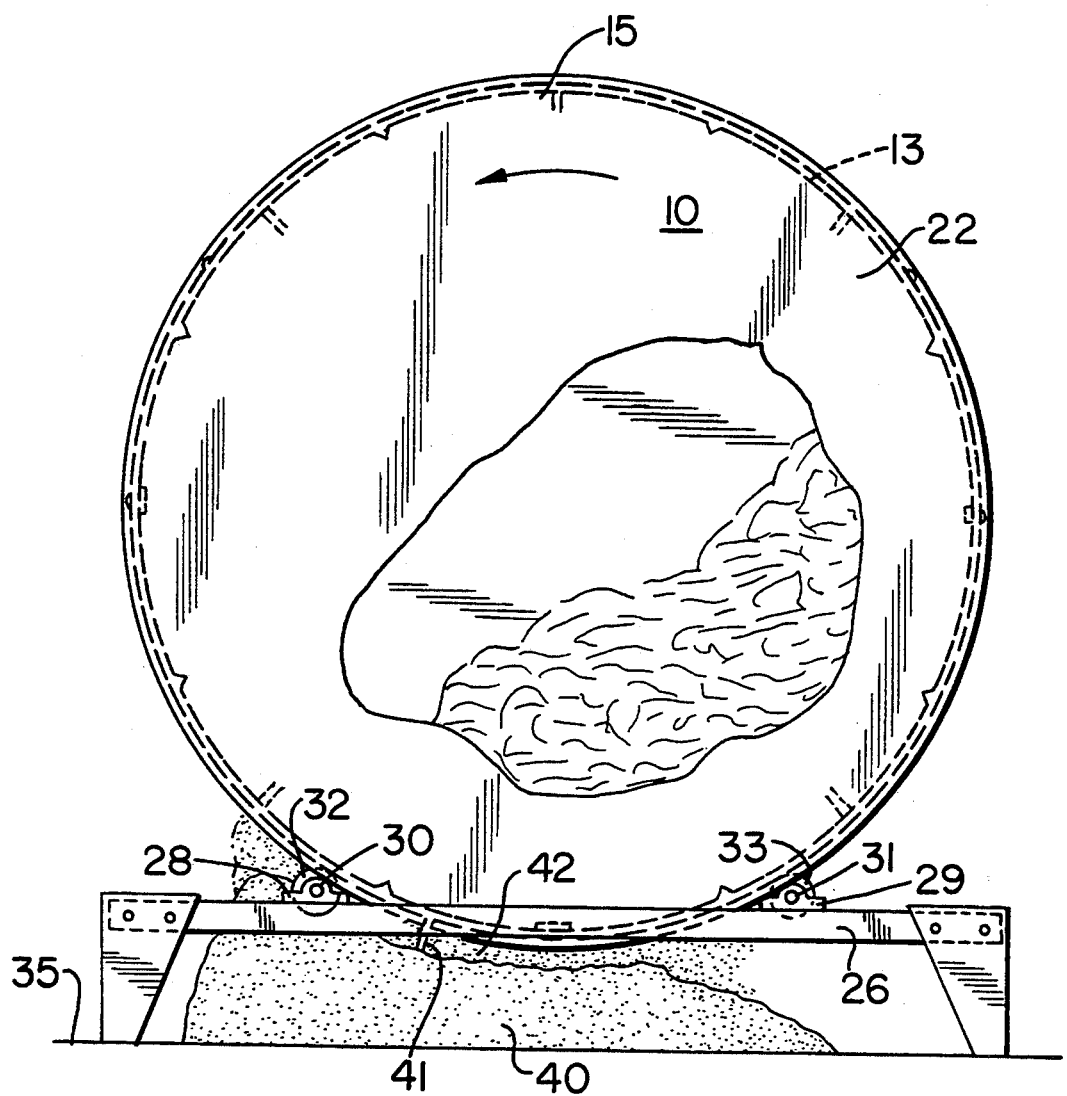
FIG. 1 is an end elevational view of a composting apparatus incorporating features of the invention.

Referring now to the drawing, the reference numeral 10 designates generally a cylindrical composting drum which is constructed of flanged drum heads 11, 12 and arcuate panel sections 13 extending between the drum heads and secured thereto by any suitable means, such as bolts, welding, etc. A plurality of the arcuate panels are assembled together to form a cylindrical outer wall 14 of the composting drum. The dimensions and number of the panel 13 is such, however, as to provide an access opening 15, located in the illustration of FIG. 3 at the top of the drum. The access opening is closed by a removable door panel 16, of arcuate shape similar to the panels 13 and spanning the access opening 15. The door panel 16 may be secured in any suitable manner. In the illustrated apparatus, one of the arcuate wall panels 17 is formed at its free edge with a hook portion 18, which engages a similar but oppositely directed hook portion 19 on the door panel 16, to secure the door at one edge. Other suitable fastening means (not shown) are employed to removably attach the opposite edge 20 of the door panel to an arcuate panel 21 forming part of the cylindrical sidewall structure of the drum 10.

The flanged drum heads 11, 12 are comprised of generally imperforate circular end wall panels 22 fixed to concentric cylindrical bands 23. The panels 22 are slightly larger in diameter than the cylindrical bands 23, providing for an annular flange 24 at each end of the drum assembly.

A support frame for the composting drum 10 is provided, in the form of four widely spaced legs 25 joined by connecting struts 26, 27 at opposite sides, and similar connecting struts (not shown) extending from one side to the other, parallel to the axis of the drum. The structure provides for a generally rectangular, open frame comprised of the four legs 25 at the corners and the connecting struts extending between the four legs. At spaced-apart points, the horizontal struts 26, 27 support bearings 28, 29, mounting shafts 30, 31. The shafts 30, 31 are spaced-apart a distance less than the diameter of the drum 10 and, in a typical and advantageous embodiment, approximately one half that diameter.

Figure 2:
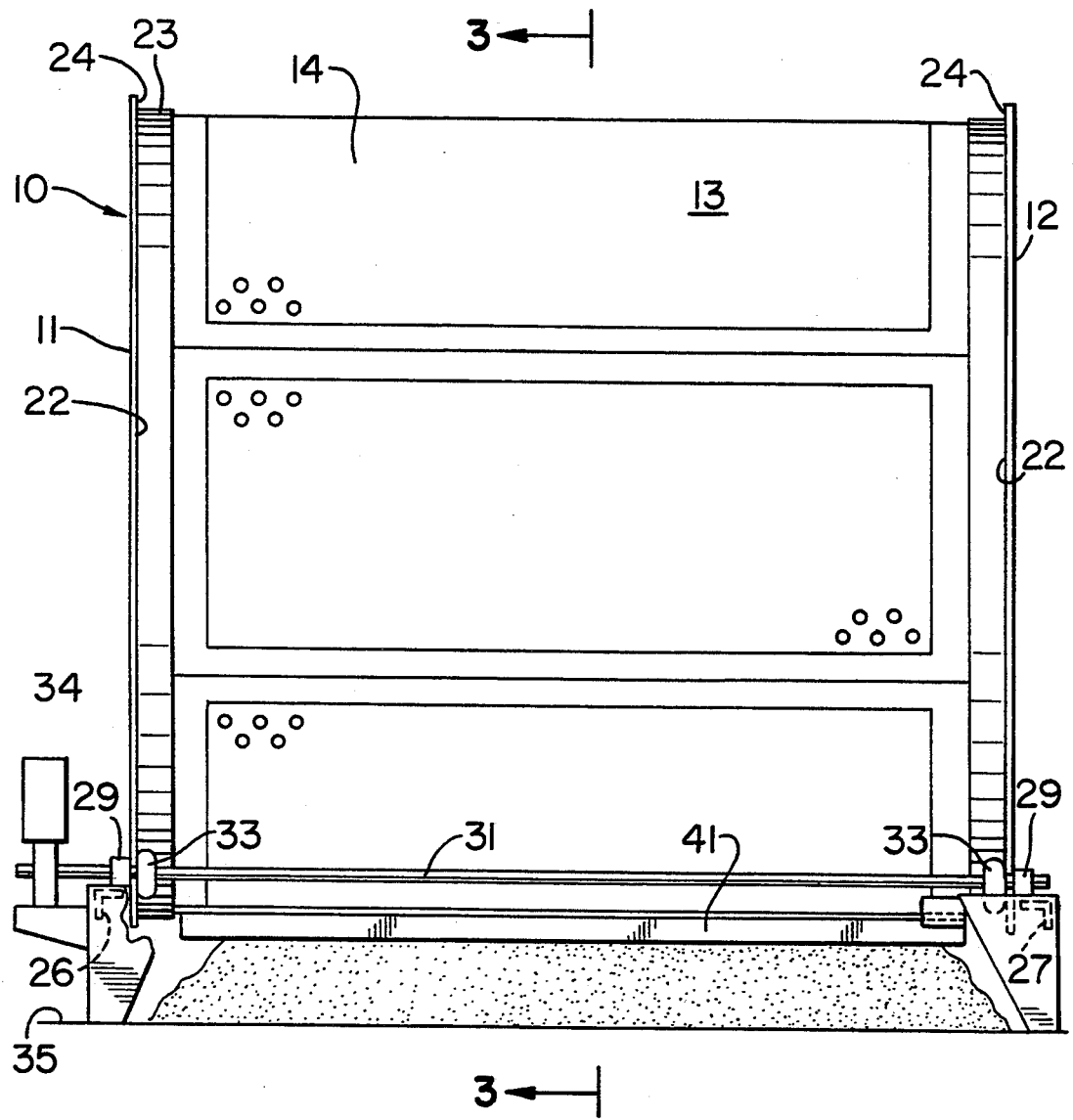
FIG. 2 is a front elevational view of the apparatus of FIG. 1.

Each of the shafts 30, 31 carries a spaced-apart pair of support wheels 32, 33. The wheels 32, 33 are fixed axially on their respective shafts 30, 31, being spaced apart thereon a distance to place them just inside the annular flanges 24, as shown in FIG. 2. The arrangement is such that the wheels 32, 33 not only support the drum 10, but also locate it axially, by way of cooperation between the wheels and the drum head flanges 24.

Desirably, at least one of the shafts 32, 33 is arranged to be driven by a gear motor 34, for which an appropriate control (not shown) is provided.

Depending upon a variety of factors, including the height of the legs 25, the spacing of the shafts 30, 31, and the diameter of the support wheels 32, 33, the composting drum 10 will be mounted above the support surface 35 a short distance, for example, 10–12 inches at the point of closest approach. The height at which the composting drum is supported above the support surface 35 is a practical function of the ability of a person to manually load the drum through the access opening 15. For optimum efficiency, the composting drum desirably might be filled to around two-thirds to three-quarters full. Accordingly, the lower edge of the access opening 15 desirably is positioned somewhat above the axis of the drum for convenient loading. With a drum having a diameter approaching four feet, for example, and having a lower edge of its access opening located several inches above the axis of the drum, there is a practical limit of 12-15 inches of spacing below the bottom of the drum, in order to avoid difficulties in manually loading the drum and handling of its cover (to be described).

In a typical composting cycle, the cylindrical sidewalls of the drum 10 are initially wrapped with a flexible cover 36 (see FIG. 3) which extends circumferentially about the exterior of the drum and is secured at its opposite end edges 37, 38. The means of attachment is not significant, and may by way of example, consist of a plurality of grommets in the end edges of the cover 36, engaging hooks on the wall panels 17, 21. Suitable lacings or other devices also may be employed to attach the cover securely and snugly to the drum. In all cases, the cover is wrapped entirely around the drum, from one side of the access opening 15 to the other. The cover is at least as wide as the width of the perforated portions of the wall panels 13, but of course of somewhat less width than the axial length of the drum, so as to terminate at each side edge at least slightly spaced from the support wheels 32, 33. Typically, the flexible cover 36 is formed of a vinyl coated fabric or the like, so as to be relatively impervious to moisture. When the cover 36 is in place, the perforated panels 13 are effectively closed to the free access of moisture, air, wild life, etc.

In the illustrated structure, the door panel 16 is imperforate and therefore does not need to be overlaid by the cover 36. However, if desired, the door panel can be rendered perforate and the cover 36 constructed so as to have an end margin overlying the perforate door panel.

After applying the cover, the drum 10 is charged with the compostable material up to a suitable level. The door panel 16 is then closed and secured and the motor 34 actuated for a few minutes to tumble and mix the contents of the drum. If the compostable materials are excessively dry, some moisture may be added.

Figure 3:
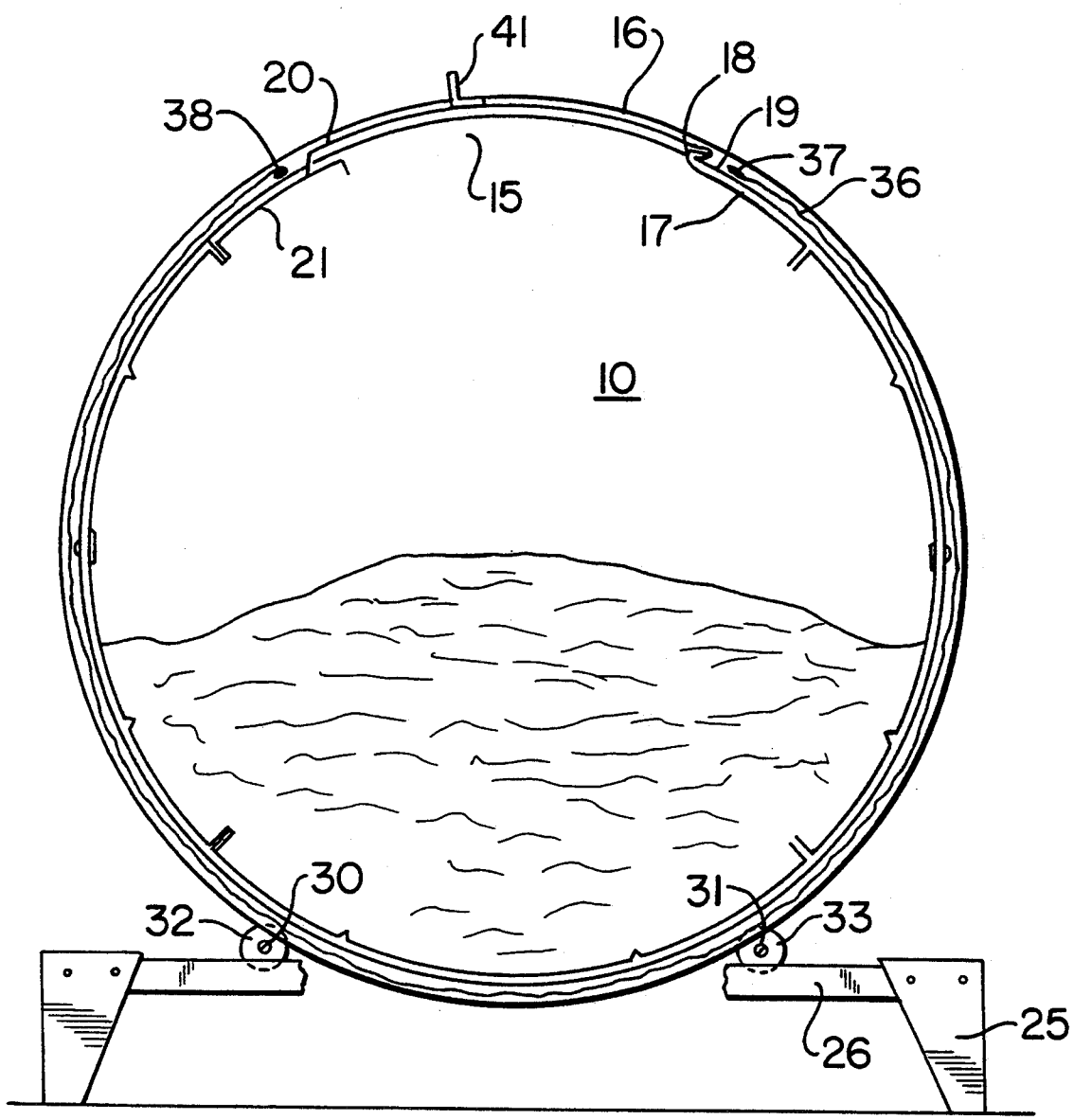
FIG. 3 is a cross sectional view of the apparatus as taken generally on line 3—3 of FIG. 2, illustrating the composting apparatus with an external blanket applied to enable the composting process to take place.

After thorough mixing, the drum is stopped and the composting processes are allowed to take place over a period of time, typically about two weeks. The progress can be monitored, if desired, by observing the temperature of the drum contents. Thereafter, in order to remove the composted mulch, the cover 36 is removed and the motor 34 is energized to rotate the drum. With continued rotation, the mulch is tumbled within the drum and sifted out through the side panel openings, to collect in a pile 40 underneath the drum and its supporting frame. With continued rotation of the drum, the pile of sifted material gradually increases in height and can eventually inhibit further outflow of sifted material as the accumulated pile 40 approaches sidewall surfaces of the rotating drum. Pursuant to the invention, a clearance space is maintained for continued sifting by mounting of a clearing bar 41 to the outer surface of the drum, extending laterally from one side of the drum to the other, but terminating a predetermined distance short of the drum head flanges 24 to accommodate the presence of the support wheels 32, 33. The clearing bar 41 may advantageously be in the form of a one and a half inch or two inch angle bar, for example, bolted or welded to the exterior of the sidewall, typically parallel to the axis of rotation of the drum. Preferably, the clearing bar is mounted on the door panel 16, as indicated in FIG. 3. This allows the ends of the cover 36 to be secured on opposite sides of the clearing bar.

As the pile of sifted mulch accumulates, in the manner reflected in FIG. 1, each rotation of the drum 10 brings the clearing bar 41 downward and over the top of the accumulating pile. As soon as the pile becomes high enough to contact the clearing bar, the uppermost accumulations of material are swept forward with the clearing bar and deposited at the downstream (right hand) side of the pile. The accumulations of mulch on the top of the pile, during the travel of the clearing bar upward and back around to a new sweeping position, ordinarily will not completely fill up the clearance space 42, so there is always space available for the continued sifting of material out of the drum and on to the pile.

As shown in FIGS. 1 and 3, the radial extension of the clearing bar 41 is such that, as the drum rotates, the clearing bar will pass over the support shafts 30, 31. The radial projection of the clearing bar should, however, closely approach the shafts 30, 31 in order to provide a meaningful clearance space below the drum.

Thirty minutes or so of sifting, at a rotational speed of, for example, three and a half to four rpm, typically is sufficient to discharge the siftable contents of the drum. No matter how long a sifting period is required, however, the clearance space 42 will be reestablished every revolution (every 15–20 seconds) so that efficient sifting and discharge is allowed to occur.

In the illustrated arrangement, the clearing bar 41 is located remotely from the access opening, and the cover 36 is applied over the top of the clearing bar for the composting phase. If desired, the clearing bar may be mounted at a location closely adjacent to the access opening, allowing the cover to be attached at a point adjacent to the clearing bar, without passing over the top of it.

The provision of the clearing bar 41 is particularly advantageous with a composting drum of cylindrical configuration, appropriate for external support by pairs of support wheels 32, 33. The arrangement allows for the composting drum to be mounted as low as practicable to the support surface, for more convenient loading of compostable materials into the drum, while at the same time assuring that the sifting operation will proceed efficiently.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A composting apparatus which comprises
    (a) a drum of substantially circular cross section,
    (b) said drum having opposite end walls and a generally cylindrical sidewall,
    (c) said sidewall including wall panels having perforated portions,
    (d) a removable door panel forming a portion of said sidewall and providing access for loading material into said drum,
    (e) a support structure for said drum, supporting said drum for rotation at a height at which the lowermost portions of said drum are above ground level while providing access to said removable door panel for manual loading of said drum with materials for composting,
    (f) a drive operative to controllably rotate said drum,
    (g) a removable cover operative, when installed, to cover the perforated portions of said wall panels and effectively prevent the passage of materials therethrough, and
    (h) a clearing bar, secured to the exterior of said drum, projecting radially therefrom and extending generally across the width of the perforated portions of said wall panels,
    (i) said clearing bar being operative, when said cover is removed and said drum is rotated, to maintain a predetermined clearance space between lower portions of said drum and upper portions of an accumulating pile of sifted composted materials passing through the perforated portions of said wall panels.

2. A composting apparatus according to claim 1, wherein
    (a) said supporting structure comprises a pair of laterally spaced-apart, rotatable shafts mounting axially spaced-apart support wheels,
    (b) circular guide flanges on said drum adjacent opposite end extremities thereof,
    (c) said support wheels engaging and rotatably supporting said drum adjacent said guide flanges,
    (d) said clearing bar extending generally from one end of said drum to the other but terminating at each end at a location spaced inward from said support wheels.

3. A composting apparatus according to claim 1, wherein
    (a) said clearing bar is mounted on said removable door panel.

* * * * *